United States Patent [19]

Henn

[11] 3,767,276

[45] Oct. 23, 1973

[54] BALL BEARING ASSEMBLY

[75] Inventor: Andrew Henn, Bridgeport, Conn.

[73] Assignee: Heim Universal Corporation, Fairfield, Conn.

[22] Filed: Oct. 18, 1971

[21] Appl. No.: 189,898

[52] U.S. Cl. ................................................ 308/6 C
[51] Int. Cl. .......................................... F16c 17/16
[58] Field of Search .................................... 308/6 C

[56] References Cited
UNITED STATES PATENTS

| | | | |
|---|---|---|---|
| 3,330,606 | 7/1967 | Suda | 308/6 C |
| 2,451,359 | 10/1948 | Schlicksupp | 308/6 C |
| 2,452,117 | 10/1948 | Ferger | 308/6 C |
| 2,628,135 | 2/1953 | Magee | 308/6 C |
| 3,357,754 | 12/1967 | Betrix | 308/6 C |

FOREIGN PATENTS OR APPLICATIONS

| | | |
|---|---|---|
| 1,931,983 | 1/1971 | Germany |
| 597,076 | 8/1959 | Italy ................................ 308/6 C |

Primary Examiner—Charles J. Myhre
Assistant Examiner—Barry Grossman
Attorney—John R. Bronaugh et al.

[57] ABSTRACT

An anti-friction ball bearing assembly adapted for mounting on a shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways.

5 Claims, 7 Drawing Figures

Patented Oct. 23, 1973
3,767,276
2 Sheets-Sheet 1
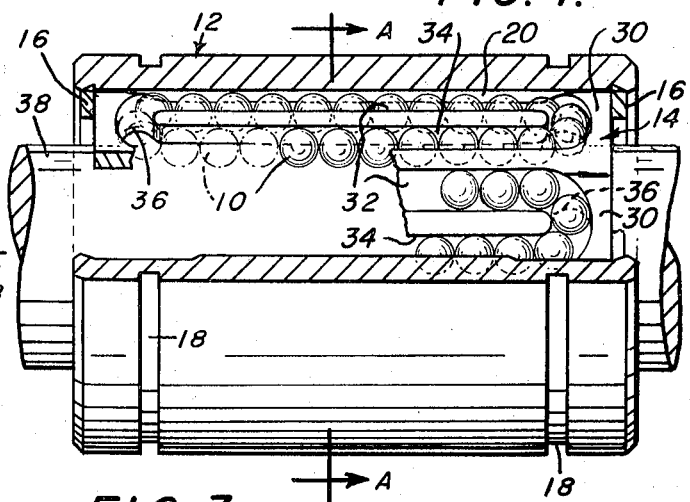
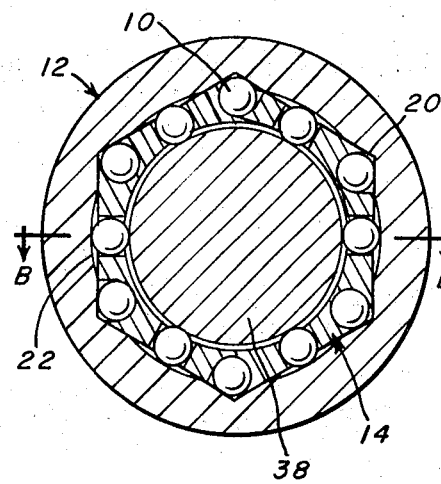
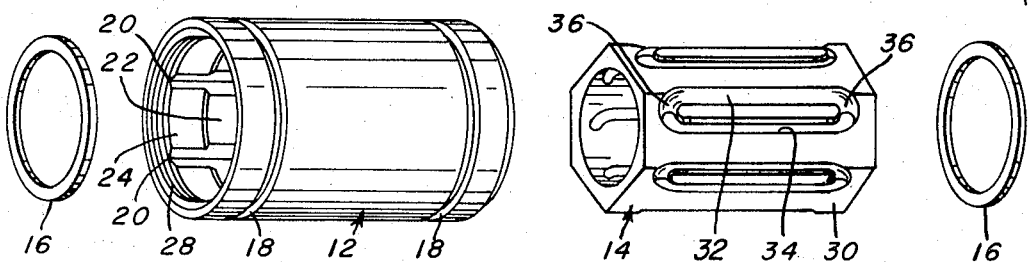
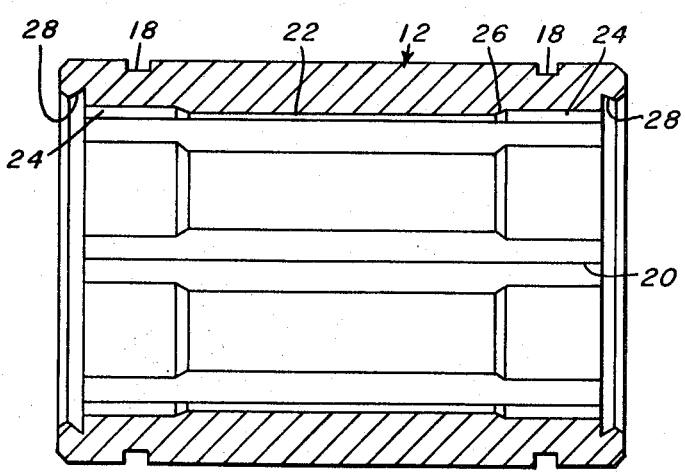
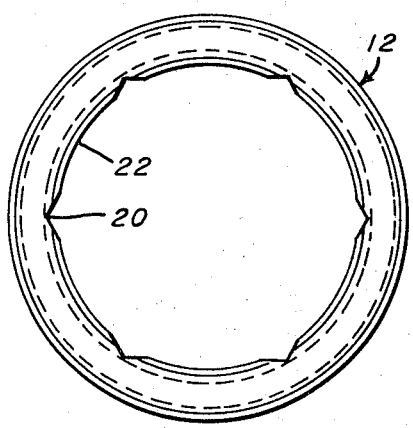
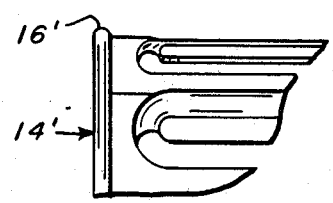

BALL BEARING ASSEMBLY

BACKGROUND OF THE INVENTION

This invention relates to a ball bearing assembly adapted to move longitudinally along the shaft.

In particular the invention relates to an anti-friction ball bearing assembly adapted for mounting on a shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways.

The prior art is replete with different types of recirculating ball bearing assemblies. Typically, the prior art forms of bearings are subject to high rates of wear between their respective parts. Additionally, they are intricate in design and expensive to manufacture. Premature wear may for example occur when the various bearing assembly components are operationally unstable. This instability will cause the recirculating balls to bind during heavy or sustained load conditions. This binding will cause among other things scoring of the balls and shaft which introduces alignment inaccuracies and ultimate failure of the bearing assembly.

U. S. Pat. No. 3,330,606 issued on July 11, 1967 to M. Suda discloses an anti-friction ball bearing assembly in which the balls are in an unstable condition during their "active" or loaded state. The balls of the Suda bearing assembly ride during their active state on a bearing surface disposed on the crown of a convex portion on the inner surface of the outer sleeve. This configuration renders the Suda bearing assembly mechanically unstable. Other forms of bearing art assemblies are likewise deficient in design.

SUMMARY OF THE INVENTION

Accordingly it is an object of the present invention to provide a ball bearing assembly adapted for mounting on a shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways.

It is another object of the present invention to provide a highly efficient ball bearing assembly capable of being inexpensively manufactured and being simplistic in design.

Another object of the present invention is to provide an anti-friction ball bearing assembly in which the number of plane surfaces of the outer surface of the inner sleeve is equal to the number of guideways formed on the inner surface of the outer sleeve.

Still another object of the present invention is to provide an anti-friction ball bearing assembly wherein the inner surface of the outer sleeve is provided with a number of substantially concave bearing surfaces of equal radii aligned with the tracks such that they provide a rolling bearing surface for the balls while the balls are in their loaded state.

DESCRIPTION OF THE DRAWINGS

The accompanying drawings, referred herein and constituting a part hereof, illustrate an embodiment of the invention, and together with the description, serve to explain the principles of the invention.

In the drawings:

FIG. 1 is a side elevation view, partially cut away, of a ball bearing assembly embodying the invention mounted on a shaft;

FIG. 2 is an end section taken along the line A—A of FIG. 1;

FIG. 3 is an exploded perspective view of the assembly of FIG. 1 with the anti-friction balls removed;

FIG. 4 is an enlarged side section of the outer sleeve of the bearing assembly of FIG. 1 showing inner surface details thereof;

FIG. 5 is an enlarged end view of the outer sleeve of the bearing assembly of FIG. 1;

FIG. 6 is a fragmentary view of one end of a modified embodiment of the inner sleeve shown in FIG. 3.

DESCRIPTION OF THE INVENTION

Figure 7:
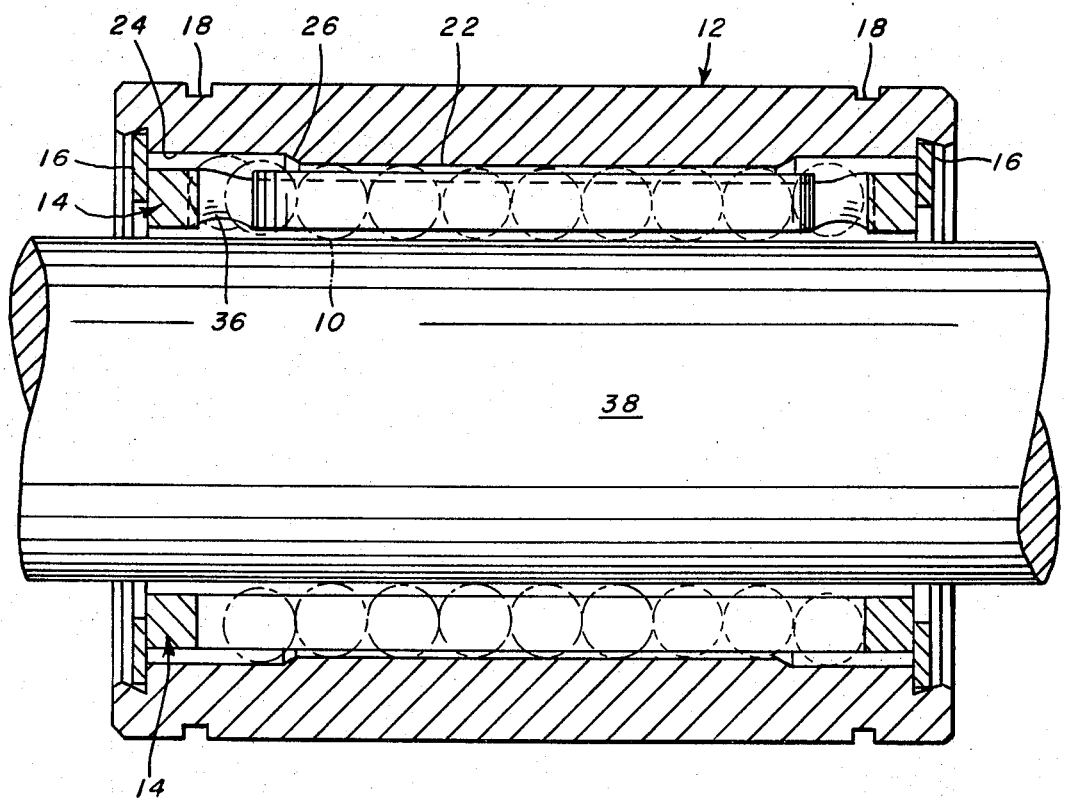
FIG. 7 is a sectional view taken along the line B—B of FIG. 2.

Referring to the drawings, the improved anti-friction ball bearing assembly of the invention includes anti-friction bearing balls 10, and outer sleeve 12 and an inner sleeve 14 serving as a bearing ball retainer. Retaining means such as snap rings 16 are provided at each end of the assembly to anchor the inner and outer sleeves axially relative to each other to form a unit. Outer sleeve 12 is a cylinder having a machined outer surface which is uninterrupted except for two annular grooves 18 formed adjacent the ends of the outer sleeve which receive retaining means, such as snap rings (not shown), to anchor the ball bearing assembly to a bushing housing. Outer sleeve 12 has an inner surface formed with a plurality of axially extending grooves 20 equidistantly spaced about the inner surface circumference.

As can be seen in FIG. 4, there is provided axially extending concave bearing surfaces 22 interposed between the grooves 20. A recessed concave end surface 24 may be provided adjacnet each end of surface 22. Concave end surfaces 24 are recessed with respect to surfaces 22 in the outer sleeve 12. A smooth transition is provided between surfaces 22 and 24 by means of tapered reliefs 26. The degree of taper will vary according to among other things the degree of clearance necessary to allow the balls to track into the grooves 20. An annular groove 28 is provided at each end of the inner surface of the outer sleeve 12 to serve as a seat for a retaining ring 16 or other suitable retaining means.

Rings 16 serve to prevent axial movement of the inner sleeve with respect to the outer sleeve. They may be dished or snap rings and may be formed of metal, plastic, or other suitable material. These rings may be positioned in grooves 28 to secure the inner sleeve 14 within the outer sleeve 12. FIG. 3 shows retaining rings 16, however, a retaining flange or rib can easily be made integral with the inner sleeve at one end thereof.

A modified inner sleeve 14' is shown in FIG. 6 wherein an annular retaining flange 16' has been integrally formed with the inner sleeve. It is also possible when using a resilient plastic material for the inner sleeve to have integrally formed thereon a retaining flange or rib at each end of the inner sleeve. A single plastic rib extension (not shown) could also be formed on the inner sleeve 14 and engage a locating recess (not shown) formed internally in the inner surface of the outer sleeve at a position not interferring with the circulation of the ball bearings.

In FIG. 3 there is shown an inner sleeve 14 having a plurality of plane portions 30 which define a polyhedron. A plurality of balls 10 circulate along tracks formed in plane portions 30. Each track is comprised of a groove 32 and a slot 34. The ends of each groove 32 are curved and are interconnected by similarly curved ends of slots 34.

Slots 34 extend completely through inner sleeve 14 and are apertured to have a width somewhat less than the diameter of bearing balls 10. Each curved end of groove 32 is provided with a ramp 36 to permit the balls to enter and leave grooves 32. The straight portions of the apertured slots 34 define the paths of circulation of the balls 10 while they are in load bearing contact with the shaft 38 and the concave bearing surfaces 22. Substantially frictionless relative movement is thereby achieved between the bearing assembly and shaft 38.

Guideways 20 serve to prevent rotational movement of sleeve 14 within sleeve 12 and with grooves 32 define the straight portion of the track in which the balls 10 are out of contact with the shaft 38. This also serves to align the axially extending slots 34 of the inner sleeve with the axially extending concave bearing surfaces 22. As can be seen in FIGS. 1 and 7, the balls are in an unloaded state, i.e., are out of active contact with the shaft 38, where they encounter the end surface 24. This facilitates smooth transition to and from the apertured slot 34.

There is thus provided an anti-friction ball bearing assembly in accordance with the present invention which is extremely simple in construction and design and is easy and economic to manufacture and assemble. The assembly procedure could be fully automated to further reduce the overall cost of the bearing. The bearing may be assembled by inserting the inner sleeve within the outer sleeve with the balls in place. This may be accomplished by registering the intersecting plane portions of the inner sleeve with the grooves 20.

Additionally, it will be appreciated that the various components of the bearing assembly in accordance with the present invention could be manufactured out of a wide range of materials including various types of plastics and metals. For example, the outer sleeve 12 may be manufactured from a hardenable steel such as SAE 5200 steel.

The inner sleeve because of its simplistic form can be manufactured from even a wider range of materials as for example lightweight metals including aluminum and zinc alloys. Obviously, plastics and other moldable materials could also be used to make the inner sleeve.

Various modifications of the bearing of the invention may be made without departing from the spirit or scope thereof and it is to be understood that the invention is to be limited only as defined in the appended claims.

I claim:

1. An anti-friction ball bearing assembly comprising an outer sleeve and an inner sleeve concentrically fitting within said outer sleeve, said inner sleeve having a central opening for the passage of a shaft therethrough, the inner sleeve having a number of tracks defining paths for the circulation of balls between said sleeves and said shaft during relative movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways, said inner surface of the outer sleeve is further provided with a number of substantially concave bearing surfaces aligned with said tracks such that they provide a rolling bearing surface for said balls while said balls are in their loaded state.

2. An anti-friction ball bearing assembly according to claim 1, wherein the number of plane surfaces of the outer surface of the inner sleeve is equal to the number of guideways.

3. An anti-friction ball bearing assembly according to claim 2, wherein said concave bearing surfaces are of equal radii.

4. An anti-friction ball bearing assembly according to claim 1, wherein the entire outer surface of the inner sleeve is polyhedronal in shape.

5. An anti-friction ball bearing assembly according to claim 1, wherein part of the outer surface of the inner sleeve is polyhedronal in shape.

* * * * *